United States Patent
Iyer et al.

(10) Patent No.: US 10,404,667 B2
(45) Date of Patent: Sep. 3, 2019

(54) SECURE, AUTONOMOUS FILE ENCRYPTION AND DECRYPTION

(71) Applicant: Bank of America Corporation, Charlotte, NC (US)

(72) Inventors: Shankar Ramasubramanian Iyer, East Windsor, NJ (US); Navanith R. Keerthi, Lawrenceville, NJ (US); Maria Auxilia Dominique, Kendall Park, NJ (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 15/354,371

(22) Filed: Nov. 17, 2016

(65) Prior Publication Data

US 2018/0139188 A1 May 17, 2018

(51) Int. Cl.
| | |
|---|---|
| *H04L 29/06* | (2006.01) |
| *H04L 9/08* | (2006.01) |
| *G06F 21/62* | (2013.01) |

(52) U.S. Cl.
CPC ...... *H04L 63/0435* (2013.01); *G06F 21/6209* (2013.01); *H04L 9/0894* (2013.01); *H04L 63/0478* (2013.01); *H04L 2463/062* (2013.01)

(58) Field of Classification Search
CPC .................................................. H04L 63/0435
See application file for complete search history.

(56) References Cited

U.S. PATENT DOCUMENTS

| | | | |
|---|---|---|---|
| 6,963,976 B1 | 11/2005 | Jutla | |
| 7,043,016 B2 | 5/2006 | Roelse | |
| 7,110,545 B2 | 9/2006 | Furuya et al. | |
| 7,346,162 B2 | 3/2008 | Slavin | |
| 7,450,720 B2 | 11/2008 | Roelse | |
| 8,681,986 B2 | 3/2014 | Jutla et al. | |
| 8,984,611 B2* | 3/2015 | Jeannot | H04L 63/08 |
| | | | 726/9 |
| 10,097,522 B2* | 10/2018 | Philipp | H04L 67/1097 |
| 2006/0005250 A1* | 1/2006 | Chu | G06F 8/61 |
| | | | 726/26 |
| 2008/0263363 A1* | 10/2008 | Jueneman | G06F 21/32 |
| | | | 713/184 |
| 2011/0072264 A1* | 3/2011 | McNulty | G06F 21/32 |
| | | | 713/168 |
| 2012/0269348 A1* | 10/2012 | Rong | G06F 21/6218 |
| | | | 380/278 |

(Continued)

OTHER PUBLICATIONS

Block Cipher, retrieved Oct. 3, 2016, https://en.wikipedia.org/wiki/Block_cipher, 13 pages.

(Continued)

*Primary Examiner* — Harris C Wang
(74) *Attorney, Agent, or Firm* — Banner & Witcoff, Ltd.; Michael A. Springs

(57) ABSTRACT

The disclosure includes novel encryption and/or decryption methods and systems that provide various security benefits. More specifically, the disclosure includes a description of a file encryption process and its ability to dynamically control permissions on who is allowed to decrypt the file. Moreover, the disclosed process permits an encrypted file to be freely distributed without losing the ability to govern/regulate decryption.

20 Claims, 10 Drawing Sheets

File Encryption

(56) References Cited

U.S. PATENT DOCUMENTS

| | | | | |
|---|---|---|---|---|
| 2013/0034229 | A1* | 2/2013 | Sauerwald | H04L 9/0822 380/46 |
| 2014/0369498 | A1* | 12/2014 | Hammersmith | H04L 9/083 380/46 |
| 2015/0326547 | A1* | 11/2015 | Carlson | H04L 63/061 713/171 |
| 2016/0112413 | A1* | 4/2016 | Wang | H04L 63/0846 713/171 |
| 2017/0302653 | A1* | 10/2017 | Ortner | G06F 21/6218 |
| 2017/0302696 | A1* | 10/2017 | Schutz | H04L 63/1441 |
| 2018/0139188 | A1* | 5/2018 | Iyer | H04L 63/0435 |

OTHER PUBLICATIONS

Key authentication, retrieved Oct. 3, 2016, https://en.wikipedia.org/wiki/Key_authentication, 2 pages.

Symmetric-key algorithm, retreived Oct. 3, 2016, https://en.wikipedia.org/wiki/Symmetric-key_algorithm, 3 pages.

Hardware security module, retrieved Oct. 3, 2016, https://en.wikipedia.org/wiki/Hardware_security_module, 4 pages.

How Encryption Works / HowStuffWorks, retrieved Nov. 15, 2016, http://computer.howstuffworks.com/encryption.htm, 3 pages.

Sep. 26, 2016—(US) Specification and drawings—U.S. Appl. No. 15/276,121.

* cited by examiner

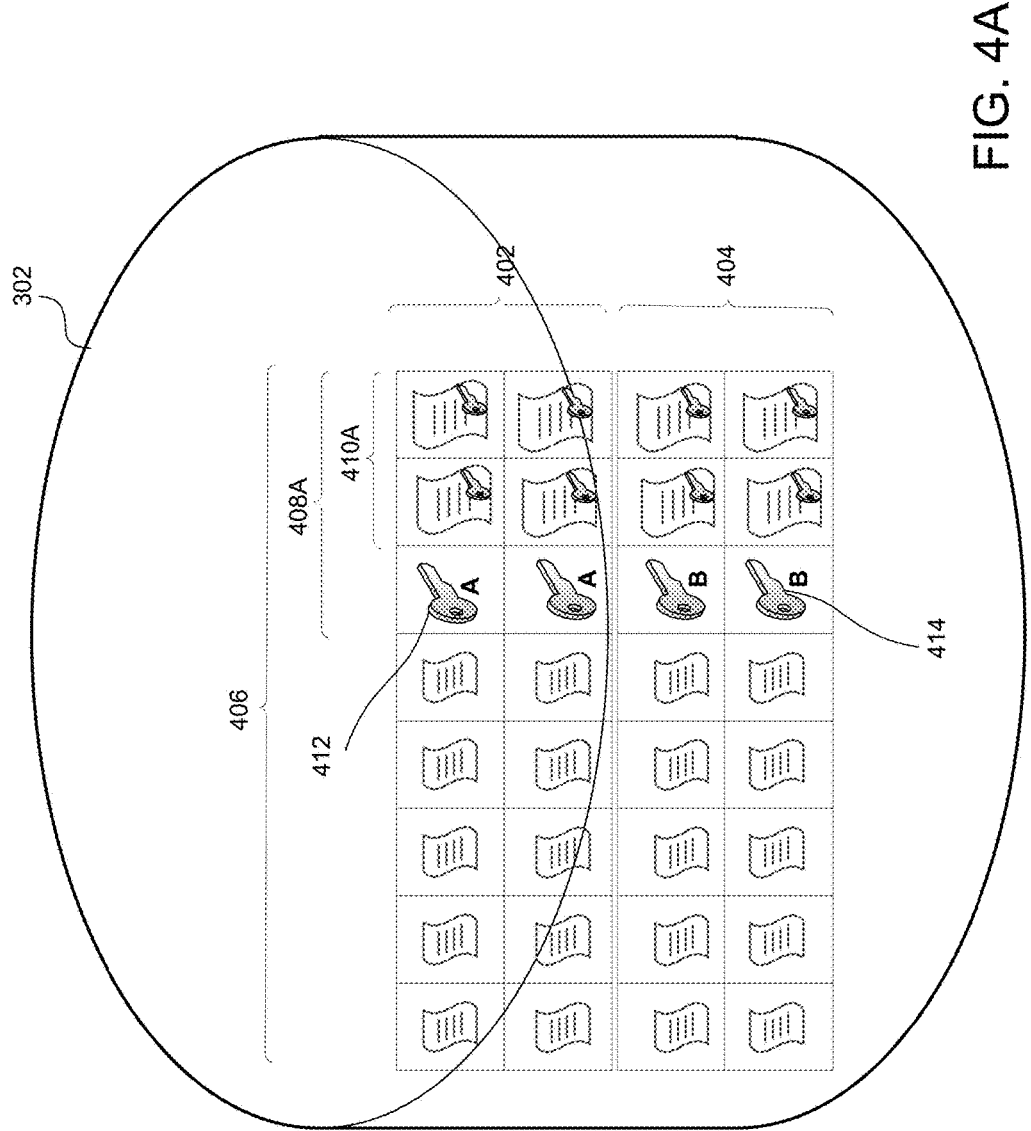

SECURE, AUTONOMOUS FILE ENCRYPTION AND DECRYPTION

TECHNICAL FIELD

The disclosure includes a novel encryption and/or decryption service that provides, inter alia, various security benefits. More specifically, the disclosure includes a description of a file encryption process and its ability to dynamically control permissions on who is allowed to decrypt the file. Moreover, the disclosed process permits an encrypted file to be freely distributed without losing the ability to govern/regulate decryption.

RELATED APPLICATION

This application is related to U.S. patent application Ser. No. 15/276,121, entitled, □Progressive Key Rotation for Format Preserving Encryption (FPE),□which was filed on Sep. 26, 2016, and the entirety of which is herein incorporated by reference in its entirety.

BACKGROUND

Many different types of encryption are known and contemplated by this disclosure. For examples, AES (advanced encryption standard), RSA, shared key, secret keys, symmetric keys, and others. The input into an encryption module is often referred to as □plaintext,□ and the output after encryption is often referred to as □ciphertext.□ Many of these encryption methodologies are use with credit card numbers, social security numbers, and other confidential information before transmission and/or storage of that information.

In addition to the challenge of encrypting data, there exists a technological challenge in managing encryption keys (e.g., generating, distributing, tracking, maintaining, and other operations involving keys). This challenge becomes markedly complex as new encryption keys are introduced into the technological ecosystem.

The existing prior art solutions include numerous drawbacks and shortcomings leaving much room for improvement.

BRIEF DESCRIPTION OF DRAWINGS

The present disclosure is illustrated by way of example and not limited in the accompanying figures in which like reference numerals indicate similar elements and in which:

FIG. 4A and FIG. 4B show illustrative system diagrams of data stores secured with data using encryption keys in accordance with an aspect of the disclosure.

BRIEF SUMMARY

Figure 1A:
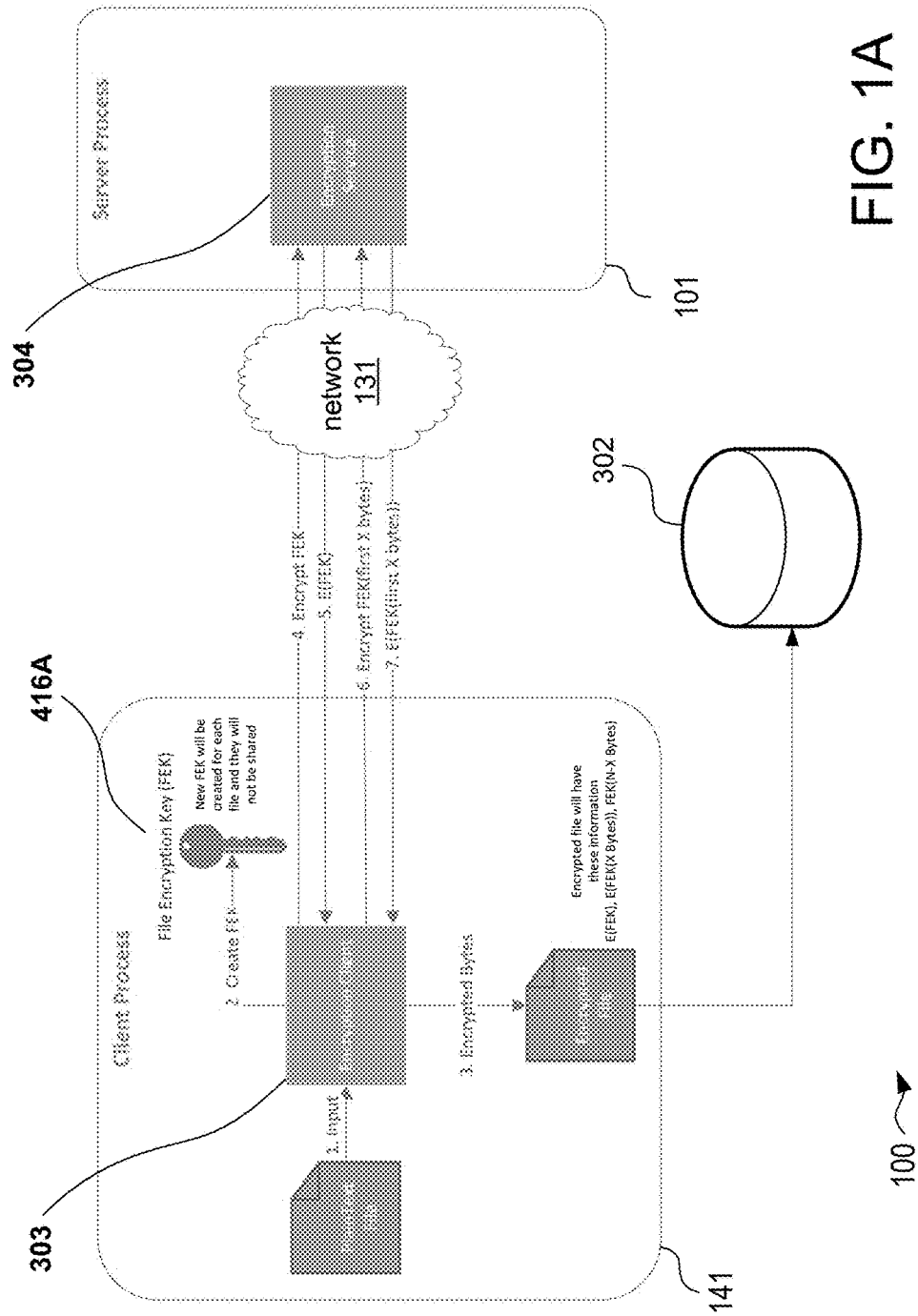
FIG. 1A and FIG. 1B illustrate examples of suitable aspects of computing system environments that may be used according to one or more illustrative embodiments.

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

The disclosure includes novel encryption and/or decryption methods and systems that provide various security benefits. More specifically, the disclosure includes a description of a file encryption process and its ability to dynamically control permissions on who is allowed to decrypt the file. Moreover, the disclosed process permits an encrypted file to be freely distributed without losing the ability to govern/regulate decryption.

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

In one example in prior art systems, files are encrypted with a symmetric key, which is the key that is used to encrypt/decrypt the file, and then is shared with all the recipients who are authorized to decrypt the file. If a recipient misplaces this shared symmetric key and/or shares with others knowingly or unknowingly, then the key is compromised and the protected data can be nefariously decrypted. In such an example where there is very little control over the symmetric key, thus the chance of the symmetric key getting compromised is very high. On the other hand, in some prior art systems, a symmetric key may be used to encrypt a file, and that key may be centrally managed and never shared with any recipients. This solution addresses the issue with sharing of the symmetric key, but this solution is not scalable. If very large size files or a large quantity of files need to be encrypted, uploading these files to a central server connected over a network to perform encryption and/or decryption would be slow and consume a lot of network bandwidth. This is also not an ideal solution because in many instances, the files will be large and transporting files to encrypt/decrypt may be error prone. Meanwhile, file encryption/decryption may be performed on very large file sizes and can be done locally to achieve better performance; however, as explained earlier, this requires the encryption key to be present on the client machine, which creates security risks in that should one file become compromised, it would impact every other file encrypted with the same key. Moreover, the challenge remains to maintain control over the encryption/decryption process so only authorized clients are allowed to encrypt and/or decrypt files. Therefore, aspects of the disclosure are directed to an innovative encryption/decryption process that overcomes one or more of the shortcomings described herein.

Figure 5A:
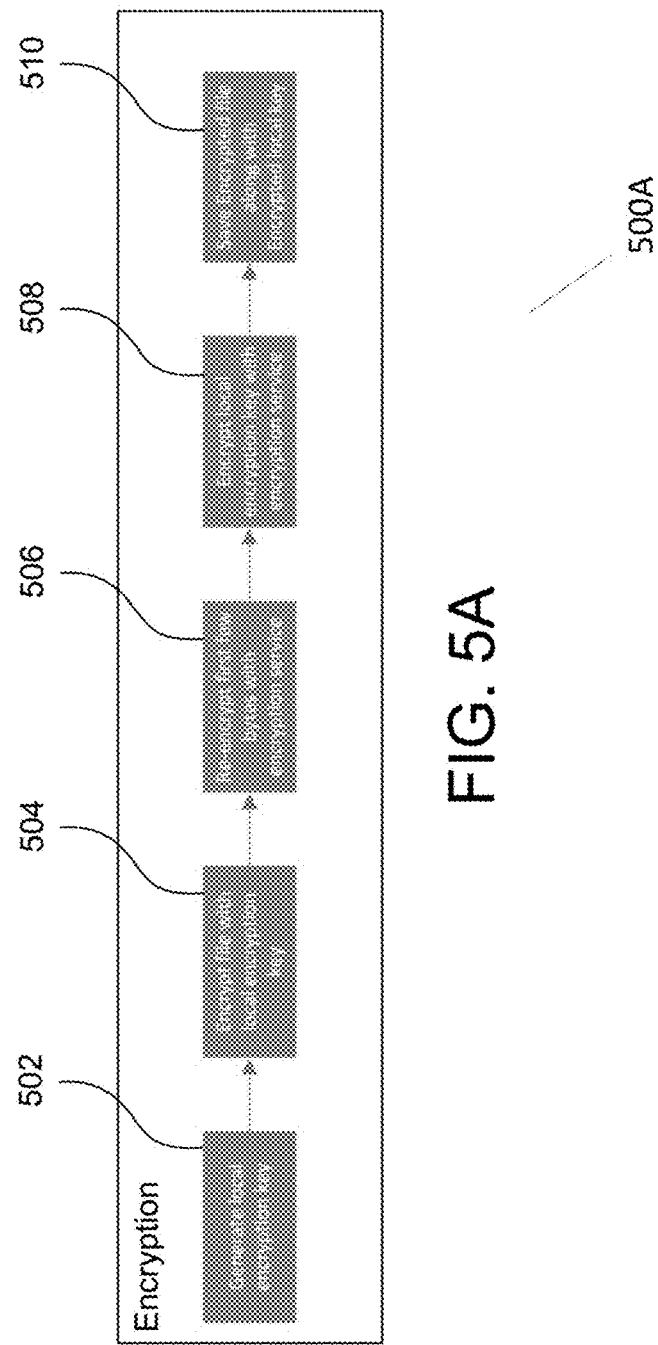
FIG. 5A and FIG. 5B show flowcharts of some steps performed in accordance with an aspect of the disclosure.

Referring to FIG. 1A and FIG. 5A, in one example, a symmetric key, referred to as a file encryption key (FEK) 416A, is used to encrypt a file in a novel and non-obvious way to provide a technological advancement in data file security. The FEK 416A may be used in addition to a central encryption key (CEK) to create a file encryption system that overcomes various drawbacks and shortcoming identified above.

In step 502, referring to FIG. 5A, a client machine 141 locally generates a FEK 416A. In one example, to ensure the integrity of each file, the FEK 416A may be generated (e.g., created) for use with only one file, then discarded. As such, a new FEK is generated for each file being encrypted. This FEK 416A is kept local to the client machine 141 and not shared with any recipients.

The FEK 416A may be generated at the client computing device 141, or may be generated at a trusted machine communicatively coupled to the computing device 141 and then transmitted to the device 141 over a secure channel. At least one advantage to such an embodiment is to offload the computational burden of generating unique keys. Alternatively, in some embodiments, to reduce the load on the client machine 141, a system of rotating keys may be implemented in which a FEK 416A is generated and used for only a period of time (e.g., one minute, one hour, one day, one month, or other period of time) before it is discarded and a new FEK is generated. In other words, a number of data files may be encrypted with that same FEK 416A during that predetermined period of time, but other files encrypted during a different period will use a new FEK. Alternatively, instead of a regular period of time, the FEK may be generated at an irregular (e.g., random) period of time, or upon the occurrence of an event (e.g., after encryption of a certain amount of data, after using a predetermined number of time, upon occurrence of a network event, or other event or combination of events).

In step 504, the FEK 416A is used to encrypt a local data file on the user computing device 141. Computer-executable instructions 300 on the computing device 141 in the form of software code, firmware, and/or application-specific hardware (e.g., a hardware security module (HSM)) may, inter alia, encrypt the data file with the FEK 416A.

In step 506, a portion of the encrypted file may then be sent over a network 131 to a remote server 101 for a further layer of encryption and functionality. The portion of the encrypted file sent to the central server 101 may be the first predetermined number of bytes of the file, or it may be a different segment of the file. In any event, by sending less than the entirety of the encrypted file (e.g., just the first 1024 bytes of the encrypted data file), less bandwidth is consumed on the network 131. In addition, latency and response time may be improved because less data and operations on that data are performed. The portion of the encrypted file sent to the server 101 is encrypted with the CEK and then the twice-encrypted data file is sent back to the computing machine 141. In some examples, a checksum may be computed and included with the encryption at the central service 304 to ensure the integrity of the data. In other examples, the checksum may be omitted.

The server 101 may include a central encryption service 304 storing a pool of secret encryption keys. These central encryption keys (CEK) are secret because, inter alia, they are not shared (e.g., accessible) outside of the encryption server 101. As such, all authorized encryption and decryption occurs behind the firewall 316 of the central encryption server 101 and the CEK may be centrally managed. Moreover, access to the central encryption service 304 is limited to only those devices 141 or systems with authorized access. While not illustrated in FIG. 1A or FIG. 5A, an authentication procedure/protocol occurs before or concurrent with the initiation of communication with the server 101.

In step 508, the FEK 416A may also be sent to the server 101 for encryption with the CEK. Although FEK 416A may many times be smaller in size as compared to the size of the data file, it may follow a similar method as the data file. For example, only a portion of the FEK 416A may be transmitted to the server 101 for encryption with the CEK. In some examples, the FEK 416A may be sent in a separate communication than the data file; but, in other examples, the two items may be sent in a single communication.

Since the CEKs 306 are secret and never shared with the client machine 141, once the data file and FEK 416A return from being encrypted at the central service 304, they are no longer readable by the client machine 141. This added level of security means that if a client machine 141 was at some point in the future compromised/lost, the central encryption service 304 at server 101 may be updated to no longer provide encryption and/or decryption services to the client machine 141. As a result, the client machine 141 will be cut-off from decrypting the files and keys, even though it may have them stored at its location.

In step 510, the local machine 141 may embed the encrypted FEK (e.g., the FEK encrypted with a CEK at the secure, central environment) within the encrypted data file (i.e., the data file encrypted with both the FEK and the CEK) such that the file can be shared, but the FEK will not be accessible until the recipient is authenticated and authorized with their own credentials with the server 101. The constructed encrypted file may comprise the encrypted FEK, encrypted checksum, and encrypted portion of the data file, and of course, the remaining portion of the data file, which has been encrypted with just the FEK and not the CEK. In some examples, the checksum may be omitted. The transformed file may then be stored in a data store 302, as illustrated in FIG. 4B and described in more detail below, without restriction to access to the files.

Figure 4B:
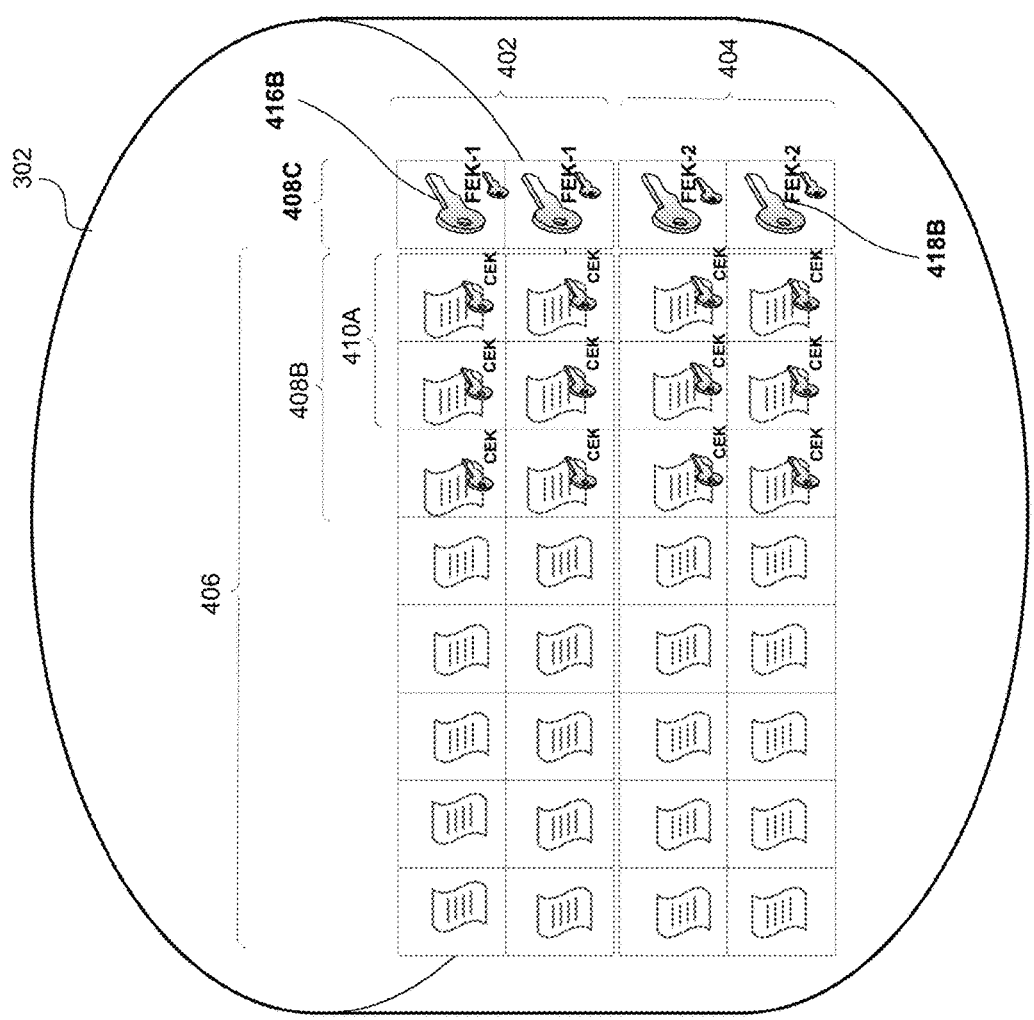

FIG. 4B shows one example of how the data file and FEKs may be stored in the data store 302. Since only a portion of the data file may be sent to the central service 304, only some data fields 408B will be encrypted with a CEK 306. Similar to FIG. 4A, the provided data fields may be re-aligned (e.g., compressed or mapped) into data fields 410A such that a key identifier may be stored in the additional field created in data fields 408B. Although such functionality may be applicable in only some embodiments, such as those where rotating keys and format preserving encryption (FPE) is used, this disclosure contemplates such features. In addition, FIG. 4B also shows that the FEK 416B encrypted by the CEK may also be stored in association with the encrypted data file. In one example, the encrypted FEK may be pre-pended or appended to the data file as shown by 408C in FIG. 4A. In other examples, the encrypted FEKs 416B, 418B may be stored apart from the encrypted data file 406, but the client machine 141 may be provided with a key map to provide a look-up functionality to find the appropriate FEK that corresponds to portion of memory. For example, the key map may show that data files stored in memory 402 correspond a FEK of ☐FEK-1☐416B, and those data files stored in memory 404 correspond to FEK of ☐FEK-2☐418B.

Figure 1B:
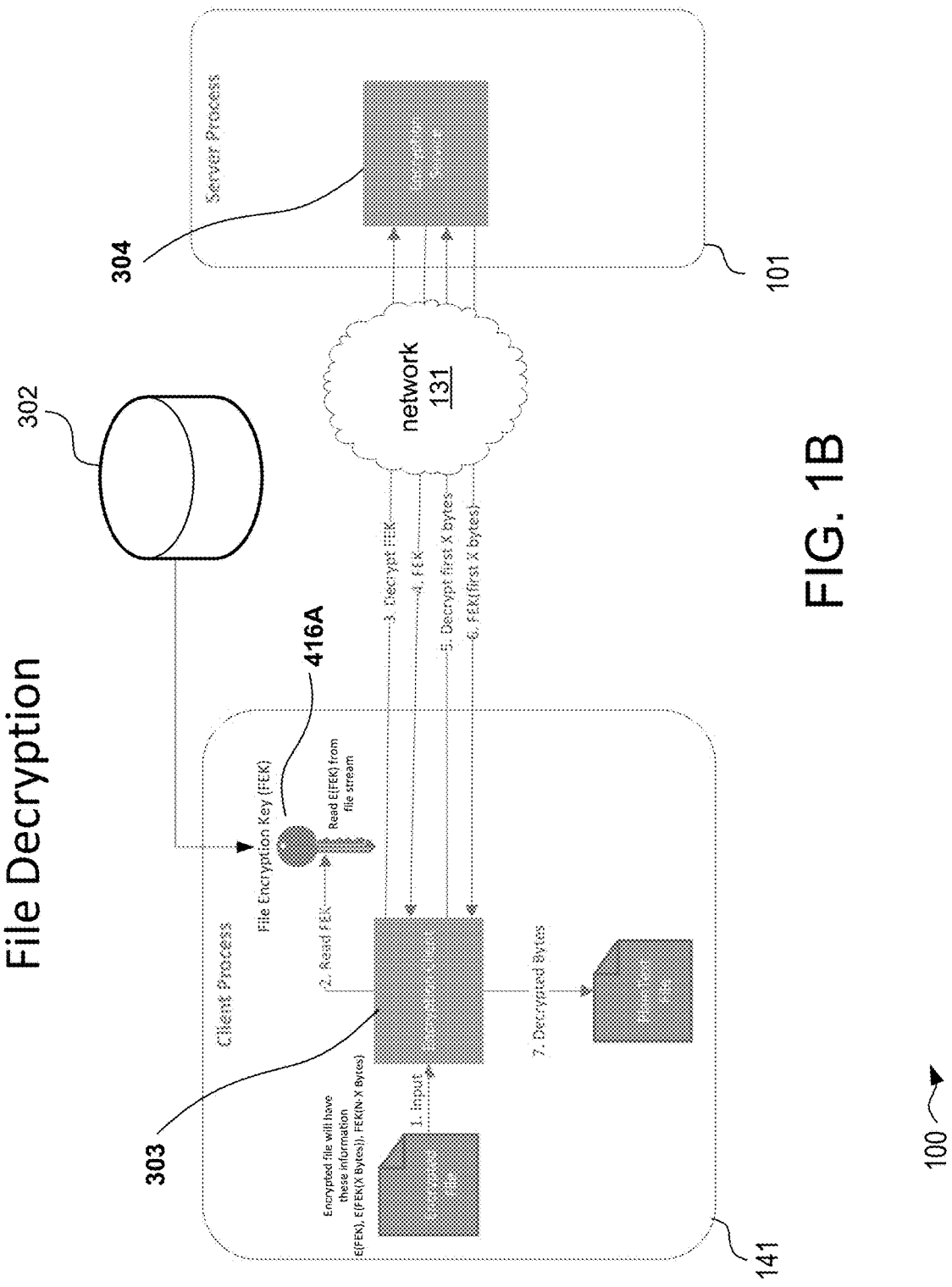
Figure 5B:
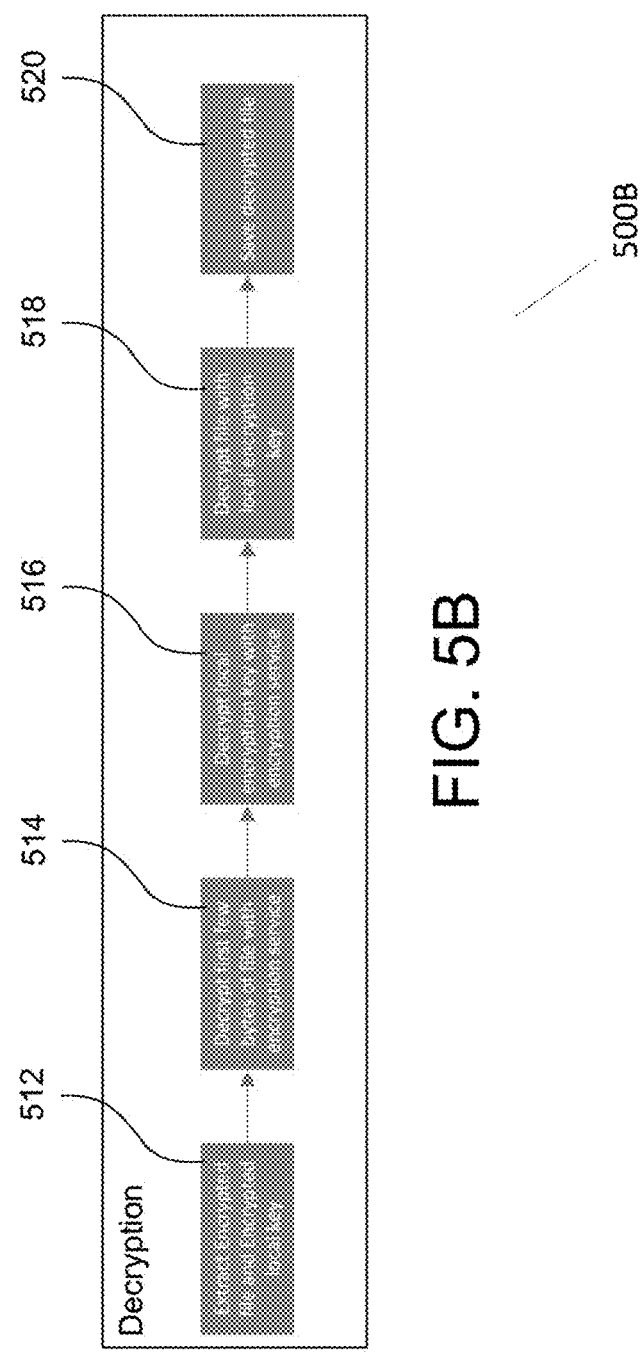

Referring to FIGS. 1B and 5B, with encrypted data files and FEKs stored in a data store 302, the user computing machine 141 may access these and decrypt them using the process and components illustrated. In one example, each recipient/user of the computing device 141 may individually authenticate themselves using their own credentials with the central server 101; once the recipient is authenticated and authorized, the encrypted data files 402, 404 must first be decrypted using the central service 304. Only then can be the FEK 416A (e.g., the plaintext FEK) be extracted and/or used to decrypt the actual contents of the data file.

In step 512, the encrypted data file is retrieved from the data store 302 and transmitted to the central server 101 for decryption using the appropriate CEK. Since the CEK is not shared, the encrypted data file must be sent to the server 101 for decryption before it can be further decrypted using a FEK. In some examples, component 303 on the user computing device may slice up the encrypted file such that only those portions encrypted with the CEK are identified and sent to the server 101. For example, just some portions of the data file 408B, 408C may be sent to the server 101 for decryption using the CEK. In other examples, the entire file may be sent to the server 101.

In step 514, the decrypted data file may be received from the server 101. The decrypted data file is still encrypted with the FEK, but now has been decrypted using the CEK. The user machine may reconstruct the data file such that the portions encrypted with the CEK and the remaining portions are put together again. Nevertheless, the contents of the data file will still be inaccessible to the user computing device 141 because the entirety of the data is still encrypted with the FEK 416A. In some examples, a checksum may be provided with the payload received. The checksum may or may not be encrypted with the FEK. If not encrypted, then even before the plaintext FEK is obtained, the checksum may be used to determine whether the file has been tampered. Assuming the checksum validation passes, then the process proceeds. In other examples the checksum may be encrypted because encrypting the checksum ensures that a malicious user cannot update the checksum.

In step 516, the plaintext FEK 416A is received at the user computing device 141 from the server 101 over network 131. Since the FEK 416A is not persisted on the user computing machine 141, it must be decrypted by the CEK and only then accessible. In one example, it is obtained when the file needs to be decrypted and then discarded thereafter, thus preventing potential nefarious use of the discarded plaintext FEK.

In step 518, the data file is now decrypted using the FEK 416A at the user computing device 141. After the decryption, the plaintext file is obtained and accessible to the user computing device 141. Meanwhile, the FEK 416A is discarded. In any event, in those examples where a FEK corresponds to a single-use encryption key, the act of decrypting the data file means that the FEK will not be used again. Instead, if the data is to be stored (see step 520) in the data store 302 again, a new FEK will be generated (see FIG. 5A) for the data and the steps of FIG. 5A are repeated in their entirety.

In the aforementioned process, CEKs are not shared and large files are not uploaded to any central service environment, thus noticeably less network bandwidth is consumed. Management of which client machines 141, 201 (e.g., recipients) may be done centrally, and the permission to decrypt/encrypt can be granted or revoked at any point. Thus, the system 100 provides a procedure for dynamic security rights.

Figure 2:
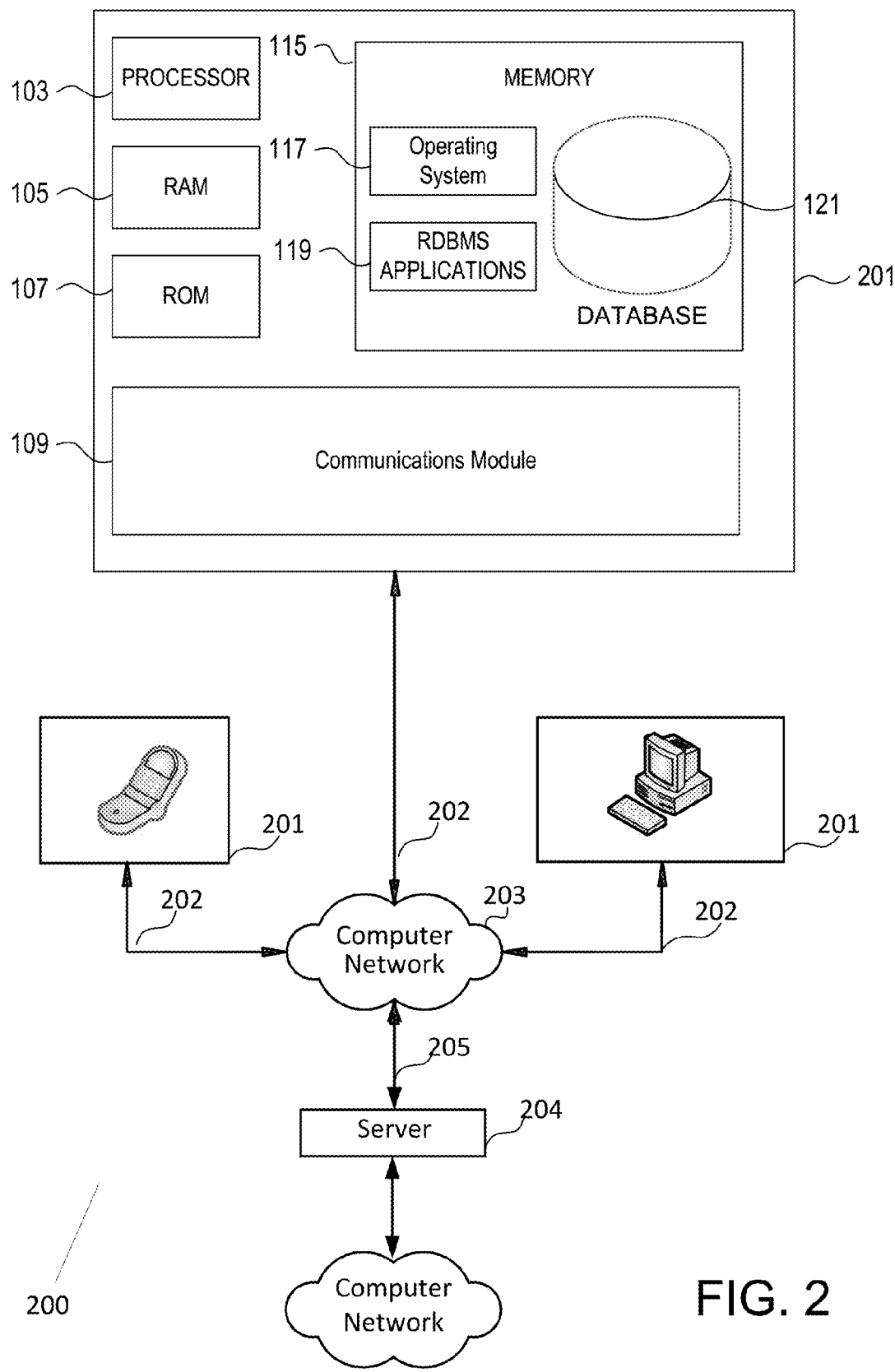
FIG. 2 shows an illustrative system for implementing example embodiments according to the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

FIG. 2 illustrates an example of a suitable computing system environment 200 that may be used according to one or more illustrative embodiments. The computing system environment 200 is only one example of a suitable computing environment and is not intended to suggest any limitation as to the scope of use or functionality contained in the disclosure. The computing system environment 200 should not be interpreted as having any dependency or requirement relating to any one or combination of components shown in the illustrative computing system environment 200.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 2, the computing system environment 200 may include a computing device 201 wherein the processes discussed herein may be implemented. The computing device 201 may have a processor 103 for controlling overall operation of the computing device 201 and its associated components, including random-access memory (RAM) 105, read-only memory (ROM) 107, communications module 109, and memory 115. Computing device 201 typically includes a variety of computer readable media. Computer readable media may be any available media that may be accessed by computing device 201 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 201.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 200 may also include optical scanners (not shown). Exemplary usages include scanning and converting paper documents, e.g., correspondence, receipts to digital files.

Although not shown, RAM 105 may include one or more are applications representing the application data stored in RAM 105 while the computing device is on and corresponding software applications (e.g., software tasks), are running on the computing device 201.

Communications module 109 may include a microphone, keypad, touch screen, and/or stylus through which a user of computing device 201 may provide input, and may also include one or more of a speaker for providing audio output and a video display device for providing textual, audiovisual and/or graphical output.

Software may be stored within memory 115 and/or storage to provide instructions to processor 103 for enabling computing device 201 to perform various functions. For example, memory 115 may store software used by the computing device 201, such as an operating system 117, application programs 119, and an associated database 121. Also, some or all of the computer executable instructions for computing device 201 may be embodied in hardware or firmware.

Computing device 201 may operate in a networked environment supporting connections to one or more remote computing devices, such as computing devices 201. The computing devices 201 may be personal computing devices or servers that include many or all of the elements described above relative to the computing device 201. Another computing device 201 may be a mobile device communicating over wireless carrier channel.

The network connections depicted in FIG. 2 include a local area network (LAN) and/or a wide area network (WAN), but may also include other networks. When used in a LAN networking environment, computing device 201 may be connected to the LAN through a network interface or adapter in the communications module 109. When used in a WAN networking environment, the computing device 201 may include a modem in the communications module 109 or other means for establishing communications over the WAN, such as the Internet or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 201, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 201. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 201. Such a processor may execute computer-executable instructions stored on a computer-readable medium.

The steps that follow in the Figures may be implemented by one or more of the components in FIG. 2 and/or other components, including other computing devices.

Figure 3A:
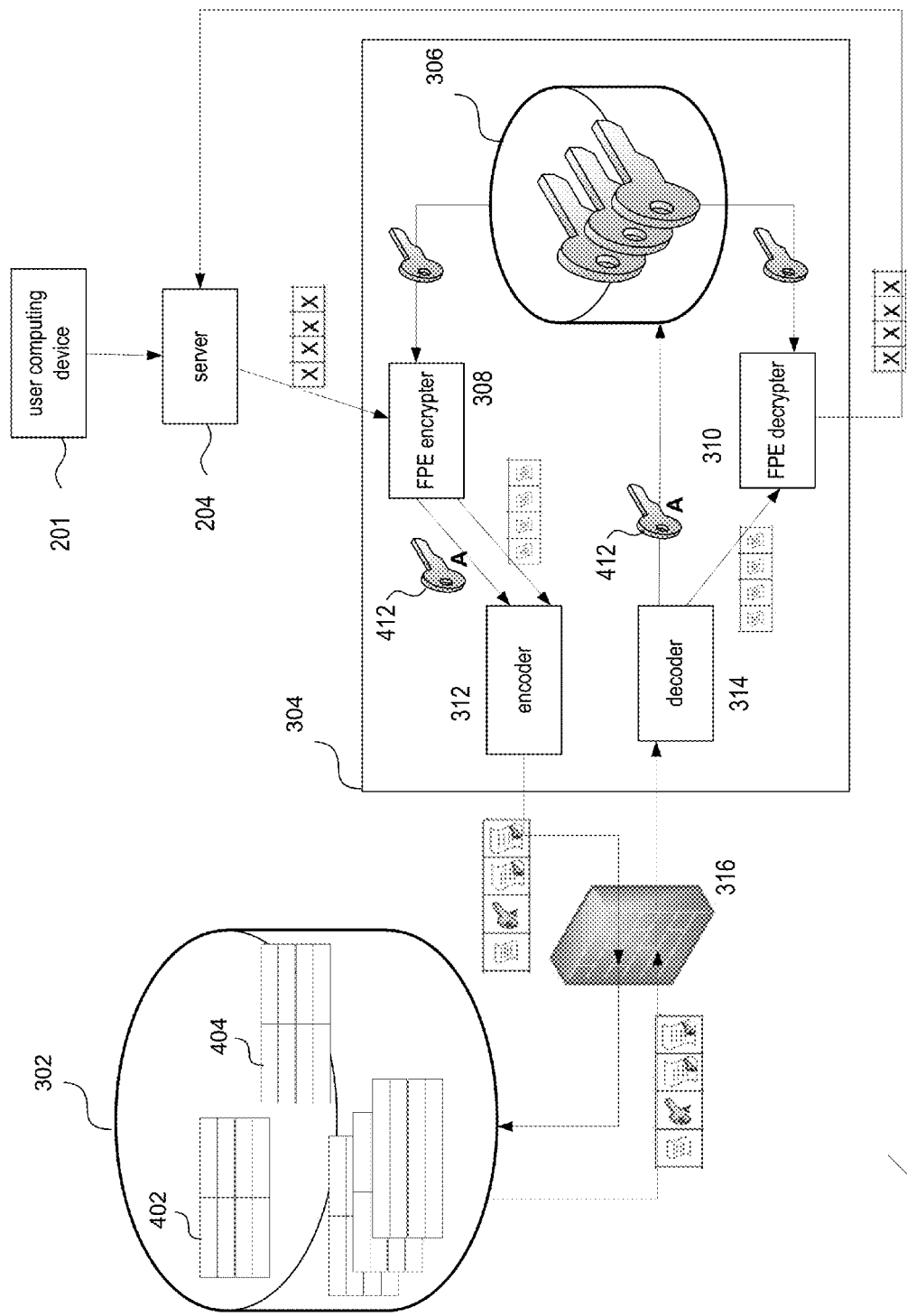
FIG. 3A, FIG. 3B, and FIG. 3C show versions of contemplated system with a plurality of computing components in communication with a central encryption service in accordance with an aspect of the disclosure.
Figure 3B:
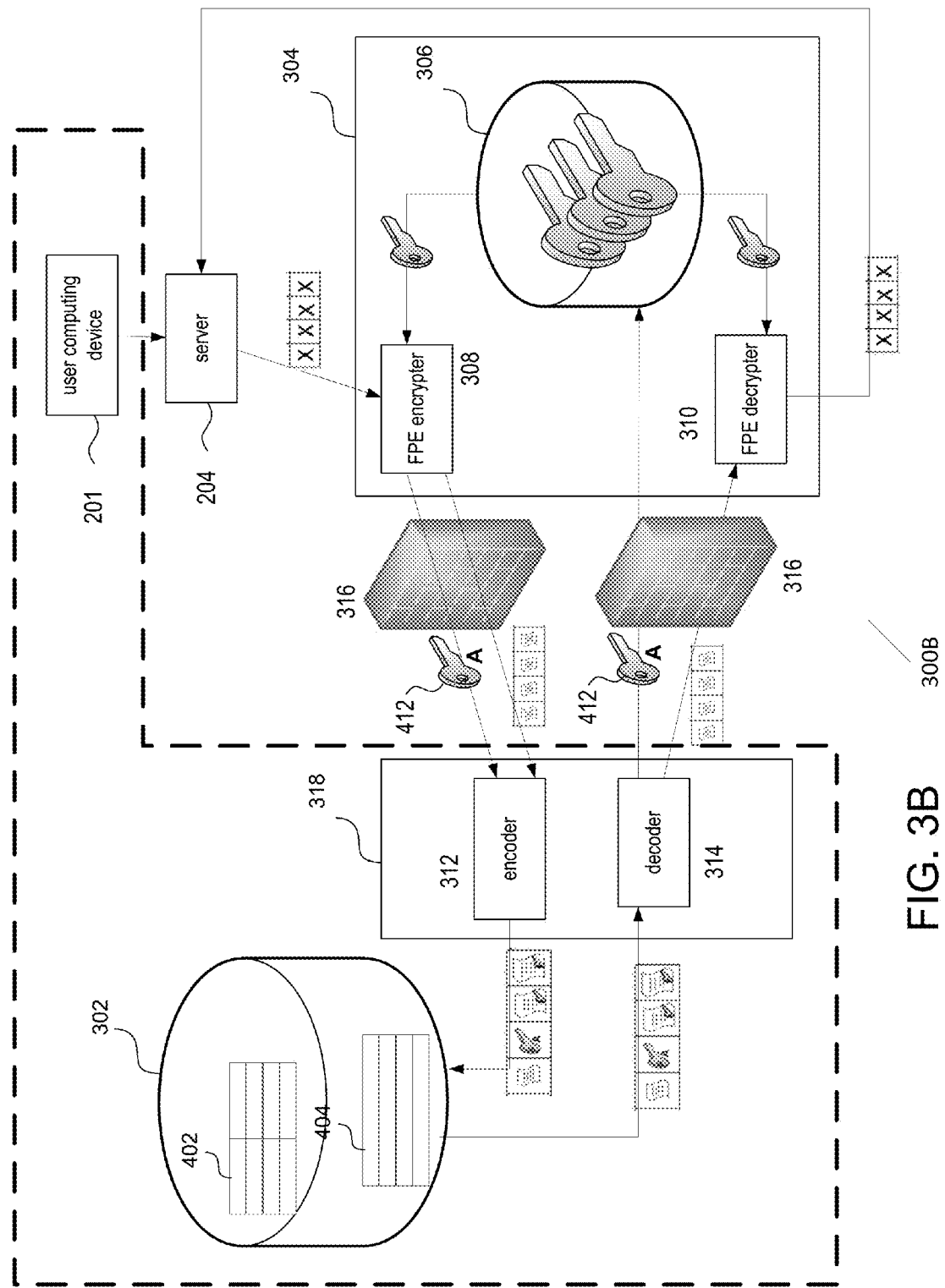
Figure 3C:
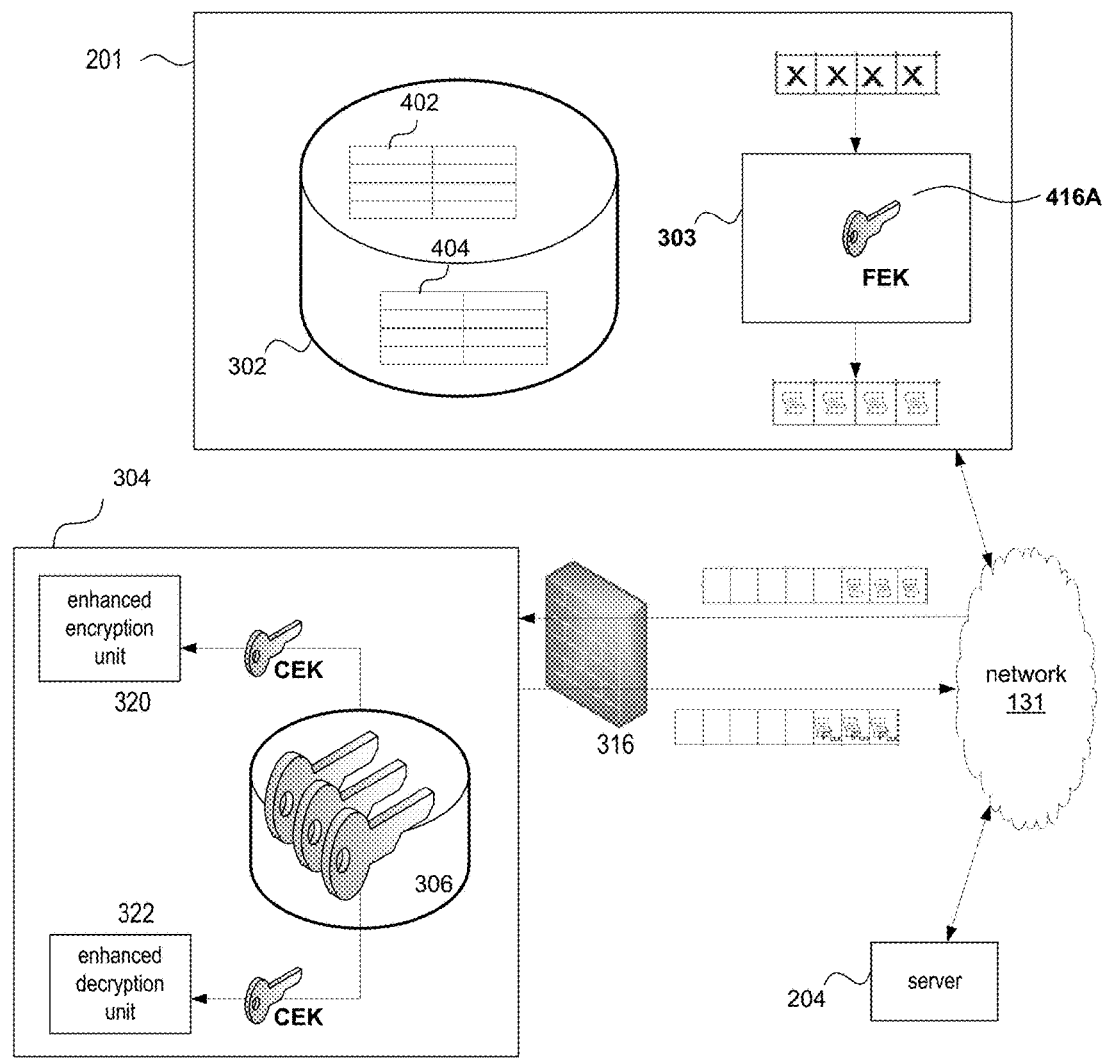

FIG. 3A, FIG. 3B, and FIG. 3C (collectively □FIG. 3□) show systems 300A, 300B, 300C with a plurality of network computing devices communicating over a network, in accordance with various aspects of the disclosure.

FIG. 3A provides, inter alia, a secure format-preserving encryption (FPE) network. FPE provides an ability to encrypt plain text such that the output cipher text has the same length as input text. For example social security number (SSN) is 9 digits and all numeric data. If SSN is encrypted with FPE, then the output is also 9-digit all numeric data. Internally, FPE may use a block cipher (e.g., AES) that uses a symmetric key. Such an approach works fine if there is only one symmetric key used for encryption and all the data is encrypted with the same symmetric key. However if the symmetric key is rotated at some point (e.g., after a certain period) then conventional FPE is insufficient. To elaborate, after the symmetric key is rotated, the cipher text to be decrypted could have been encrypted with a previous symmetric key or a new rotated key. As such, FPE by itself is incapable of inherently supporting rotating keys.

To support symmetric key rotation, the system of FIG. 3A disclosed herein provides a mechanism by which the symmetric key used to encrypt the data is identifiable from within the FPE ciphertext itself. The correct key is identified and determined from the ciphertext, and then the decryption process proceeds with the correct key to return valid data. With FPE involving fixed length data, a mechanism is disclosed to embed a key identifier in the fixed length data without having to increase the length. In the case of all numeric fields such as a social security number (SSN) or credit card number, an approach of using alphabet (e.g., A □ Z) to identify the key may be used. In some examples, the last three numbers of the fixed length data may be used to identify the key. The disclosure contemplates the aforementioned approach being expanded to more than three numbers.

To increase the responsiveness (e.g., reduce latency) of the encoder 312 and decoder 314, a mapping table may be used that stores pre-calculated mappings of alphanumeric values to the last three numbers of the fixed length data. Because, in this example, three digits are being used, the range is from 000 to 999. As such the alphabetic characters (A □ Z) used to identify each rotating encryption key may be, in one example, as illustrated in related, U.S. patent application Ser. No. 15/276,121, in FIG. 5, which was previously incorporated by reference in its entirety. Because, in this one example, the character values of the ciphertext are limited to be only a possible 0, 1 □ 8, 9 value, then the key identifier, with three digits, can accommodate up to a possible 1,296 values (i.e., 36 unique values of 0, 1 □ 8, 9, A, B □ Y, Z in each digit) into just two digits. The 1,296 possible values can be mapped to the range of 000 to 999 that previously occupied three digits. As such, the remaining digit in the key identifier is open space for embedding of an encryption key ID while still maintaining the constraints of FPE.

Regarding FIG. 5 of related, U.S. patent application Ser. No. 15/276,121, notably, the alphanumeric values (see columns KEY1, KEY2, □ KEY26) in the mapping table occupy the same fixed-length space as the last three numbers (see column 506), and may be used to identify the key. As such, the constraints of a FPE ecosystem are maintained while still allowing for a key identifier to be injected into the FPE string. Thus, the FPE ciphertext string is transformed in accordance with various aspects of the disclosure. Moreover, the number of rotating keys available to the system in FIG. 3A is twenty-six (e.g., KEY1 □ KEY26). However, in some examples, the number of available rotating keys may be increased to thirty-six if in addition to A□ Z values, the values of 0 □ 9 are also allowed for key ID. Moreover, in yet other examples, both upper and lower case alphabetic characters may be permitted to allow yet even more possible rotating key ID. One reason to limit key ID to just A □ Z values is to allow for a quick comparison of the designated key ID character in a ciphertext string to determine if it is an alphabetic value in a normally all-numeric string. Thus, the determination can be made more efficiently.

In two examples illustrated in Table 1, below, the last three characters of a FPE ciphertext are translated/encoded with an embedded key identifier. Although in this illustrative system, the last three characters were pre-defined for the key identifier fields, other consecutive or non-consecutive characters may be used for the key identifier field in other examples.

TABLE 1

| Input | FPE before embedding key | FPE after embedding key |
|---|---|---|
| 123456789 | 877244098 | 877244A98 |
| 987654321 | 958688480 | 958688AJK |

For example, an input of □12345679□ provided by a user computing device 201 would be sent to a server 204. The server 204 may communicate behind a firewall (not illustrated) the plaintext to a FPE encrypter 308 that encrypts the plaintext into ciphertext of □877244098□.

Regarding the FPE encryption process, the encryption server system 304 retrieves a current encryption key from among the plurality of encryption keys pooled in the private memory 306 and provides it to the encrypter 308 for use in the FPE encryption process. In some examples, the encryption server system may comprise an enhanced encryption unit and enhanced decryption unit, as illustrated in FIG. 3C of related, U.S. patent application Ser. No. 15/276,121, which was previously incorporated by reference in its entirety. Alternatively, the FPE decrypter 310 and decoder 314 may be organized as separate units that coordinate and cooperate to produce a similar outcome, as illustrated in FIG. 3A. Likewise, the FPE encrypter 308 and encoder 312 may be organized as separate units that coordinate and cooperate to produce a similar outcome. The encrypter 308 encrypts with FPE the plaintext into ciphertext using the current encryption key provided to it. With FPE, the ciphertext is an identical fixed length as the plaintext.

Next, the ciphertext is then translated/encoded by the encoder 312 into 877244A98□. The encoder 312 may store a mapping table with a mapping for converting □098□ into □A98□. The converting results in a translation/encoding of a key ID of □A□ into the FPE ciphertext. The transformation of the ciphertext is performed by compressing a portion of ciphertext to create open space in the ciphertext to store the encryption key ID. Then, embedding the encryption key ID of □A□ in the open space in the ciphertext without causing the ciphertext to change in length. The encryption key ID may be in plaintext (e.g., □A, □ which is readable and immediately identifiable as unique without decryption) or may be in a non-plaintext form.

Finally, this transformed ciphertext may be then be transmitted and stored in a data store 302 with other transformed ciphertext with the same key ID 402 or even a different key ID 404. Because the FPE ciphertext 406 is encoded with a key identifier 408A it can now be effectively stored/archived anywhere without concern for which encryption key from a potential pool 306 of rotating encryption keys is the current key at the time the ciphertext needs to be decrypted for access. In addition, because the encoding of the key identifier 408A occurs in plaintext after the FPE encryption has already generated a ciphertext, the key ID 412 may be identified at any time without requiring decryption of the ciphertext. This ability to identify the key ID without requiring decryption permits users (e.g., a user of computing device 201, a security administrator of the overall system 300A, 300B, or other user) to more efficiently and effectively react in the event of a data breach of particular encryption keys. For example, a breach of just that encryption key corresponding to key ID 414 means that ciphertexts 402 in data store 302 is not at risk, and only ciphertexts 404 require remediation (e.g., taking offline particular data, immediate decryption and re-encryption with a new encryption key, and other actions).

In an example illustrating the decryption process, a server 204 may later request a stored, transformed ciphertext to be retrieved from data store 302, decrypted, and provided to user computing device 201. In one example, during the decryption process, the last 3 characters, which correspond to the key identifier, are retrieved and processed. If the key ID in the key identifier is an □A□, then, according to the example of FIG. 5 of related, U.S. patent application Ser. No. 15/276,121, which was previously incorporated by reference in its entirety, the system 300A will use Key1. Once they key is identified, the key identifier fields are replaced with the corresponding 3-digit number. Then, the FPE decryption process may proceed with the FPE decrypter 310 being provided with an identification of which encryption key (e.g., key □A □) to use for the decryption. The decrypter 310 requests the appropriate key from the key data store 306 and decrypts the ciphertext into the original plaintext value. That value may then be transmitted to the server 204 and eventually a user's device 201.

In another example referencing FIG. 3B, the ciphertext string is transmitted from the FPE encrypter to an encoder. However, unlike the implementation 300A in FIG. 3A, in this FPE ecosystem implementation the encoder is positioned outside of the firewall. The encoder, in some examples, is implemented as a plug-in for a web browser. That plug-in may optionally also include a decoder. In such an example, the plug-in may be executing in the context of a web browser running on a user computing device. Alternatively, the computer-executable instructions embodying the encoder and decoder, which collectively may be referred to as a FPE coder, may be implemented in forms other than a plug-in for a web browser. For example, the FPE coder may be implemented as client-side scripting code, such as Javascript (or asynchronous Javascript AJAX), executing in a web browser, and a data store may store tables 402, 404 with Internet cookies or other Internet data files. In another embodiment, an FPE coder may be implemented as a standalone application installed on a user computing device to interface with the FPE encrypter and FPE decrypter installed on an encryption server system.

Continuing with the previous example, the FPE coder may receive an input indicating which key ID 412 to use to encode the key identifier into the ciphertext. The FPE coder will then use the encoder to translate the bits 408A in the ciphertext corresponding to the key identifier into a compressed translation 410A based on a mapping table. The open space resulting from the translation (e.g., compression) is then occupied by the encryption key ID 412 provided as an input into the FPE coder (e.g., encoder).

Meanwhile, for decoding, the decoder includes instructions to extract the key identifier from the ciphertext stored in data store 302 without requiring the ciphertext to be decrypted. The key ID 412 in the key identifier 408A is used to identify which encryption key to use. In the example of the decoder, in addition to sending the original ciphertex to the FPE decrypter for decryption, the decoder also sends the encryption key ID (e.g., KeyA 412) so that the FPE decrypter retrieves and/or uses the appropriate encryption key from the key storage pool 306. After the key ID has been retrieved from the ciphertext, the ciphertext may be translated back to its original ciphertext that can then be decrypted as typically done with FPE.

In the aforementioned examples, the FPE coder performs the operations of encoding and decoding using a mapping table 500 as illustrated in FIG. 5 of related, U.S. patent application Ser. No. 15/276,121, which was previously incorporated by reference in its entirety. A single mapping comprises multiple key IDs 412, 414 and the corresponding translations for each key ID. For example, referring to the data store 302 in FIG. 4A, the memory stores ciphertext encrypted with different encryption keys such that entries 402 are encrypted and encoded with a first key ID 412 while entries 404 are encrypted and encoded with a different, second key ID 414. In one example, the data store 302 may be located at a user computing device 201 and the entries 402, 404 may correspond to Internet cookies or other data files managed by a browser (or other Internet software application) installed on the user computing device 201. As a result, the user computing device 201 has access to the mapping table so that the encoder 312 and/or decoder 314 may use the mapping table to translate the portion of the key identifier corresponding to the compressed translation 410A of the initial ciphertext into its original, initial ciphertext occupying more bits 408A than the compressed version 410A. In other words, the mapping table may be, in some examples, a publicly and readily accessible data store and/or algorithm/formula available to all FPE coders.

The FPE coder 318 also includes the particular configuration information indicating which bits of the ciphertext contain the key identifier. For example, the configuration information may indicate that a predetermined number of right-most bits/bytes of a ciphertext contain the key identifier. In another example, the configuration information may indicate that a predetermined number of left-most bits/bytes of a ciphertext contain the key identifier. In yet another example, the configuration information may indicate that a predetermined number bits/bytes spread across a ciphertext contain the key identifier. For example, in FIG. 4B of related, U.S. patent application Ser. No. 15/276,121, which was previously incorporated by reference in its entirety, the compressed version of the ciphertext runs almost the entirety of the initial ciphertext. Nevertheless, in some examples, a standard (or de facto standard) may dictate which bits and/or how many bits are occupied by the key identifier; and in such examples, the FPE coder may be hard-coded with that information instead of including the entirety of the aforementioned configuration information. Furthermore, in alternate examples, a mapping table may be replaced by a predetermined set of steps (e.g., an algorithm) performed to translate between original, initial ciphertext and its corresponding key identifier.

In the foregoing examples of FIG. 3B, at least one advantage of a FPE coder 318 separate from server machine 304 is the distribution of computing load across the network. This distribution reduces the computing load on the encryption server machine 304 while also potentially reducing latency/increasing responsiveness of the encoder 312 and decoder 314. In addition, in examples where data store 302 is located at the user computing device 201, a user is able to hold (e.g., control) their own encrypted data instead of relying upon another person/entity to hold and secure their data. Moreover, the aforementioned approach is operable even with a rotating key approach because, unlike prior format-preserving encryption (FPE) approaches, the ciphertext stored in data store 302 includes an embedded key identifier 408A comprising an encryption key ID 412. As a result the decoder may retrieve the encryption ID 412 of the encryption key without requiring the decryption of the ciphertext or reference to a table. Rather, the encryption identifier 408A is accessible as plaintext at the appropriate bit/byte sequence.

In yet another example, a computer system is disclosed comprising an enhanced encryption unit 320 and enhanced decryption unit 322 to transfer plaintext data into a ciphertext value using format-preserving encryption (FPE) that has embedded in it a key identifier for rotating encryption keys. A server 204 may send plaintext to an enhanced encryption unit 320 for transformation into the aforementioned ciphertext. The transformation of the plaintext may include both encrypting it and/or then subsequently translating/compressing it to embed a key ID field 412.

The aforementioned transformation may include retrieving a current encryption key from among the plurality of encryption keys 306 in the private memory. The current encryption key may be uniquely identified by a first encryption key ID 412. The FPE encrypter 308 may then use the current encryption key to encrypt with FPE the plaintext into ciphertext. The FPE results in the ciphertext being an identical fixed length as the plaintext. In addition, to allow for a more robust encryption system, rotating keys may be used. After encrypting, the encoder 312 may compress a portion 408A of the ciphertext to create open space in the ciphertext to store the first encryption key ID 412. As explained herein, the compression includes using a readily accessible mapping table to translate in a loss-less manner, to create the open space in the FPE ciphertext.

Next, the encoder 312 embeds the first encryption key ID 412 in the open space in the ciphertext without causing the ciphertext 406 to change in length. The encryption key ID 412 may be plaintext such that it is readable without requiring decryption of the entire transformed ciphertext. Based on the quantity of different values the encryption key ID field (i.e., the open space) can hold, the number of different keys can be rotated from among the pool 306 of encryption keys. Finally, the transformed ciphertext 406 may be transmitted for storage as appropriate.

While FIG. 3 shows alternative embodiments of various features disclosed herein, they illustrate a communications network 300A, 300B, 300C comprising a public network and a private network. In some, but not all examples, the communications network is constrained by the fact that it uses, inter alia, format-preserving encryption (FPE) to secure plaintext by transforming it into ciphertext that is operable with rotating encryption keys. The communication network includes private memory 306, which is securely located on the private network behind a firewall, to store a plurality of encryption keys. The keys may be rotated and each key is assigned an unique encryption key ID. Since the encryption keys are stored in the private memory 306, it is generally inaccessible from outside of the private network. Meanwhile, various aspects of the enhanced encryption unit 320 and enhanced decryption unit 322 may be located inside and/or outside of the private network. Aspects of these units 320, 322 transform the plaintext into ciphertext and then into transformed ciphertext, as explained herein.

The features disclosed herein may also be used with other types of data that would benefit from encryption while maintaining the formatting of its plaintext and ciphertext. In one example, maintaining formatting includes keeping the length of bits of the ciphertext the same as the length of bits of the plaintext. In addition, any encrypted data that uses rotating keys to encrypt the data would benefit from the features disclosed herein. In some examples, encryption keys may be rotated more or less frequently than in other examples. For example, the encryption key used to encrypt plaintext data may be changed (e.g., rotated) on a time basis (e.g., monthly, annually, weekly, bi-annually, bi-monthly, bi-weekly, daily, hourly, or other time period) and/or based on the current date. In another example, the current key may be changed based upon occurrence of an event. Some examples of events include receipt of more than a threshold quantity of denial of service (Dos) attacks (or other type of malicious attack/threat) by a system, receipt of a software update from an anti-malware software provider, and/or consumption of an excess of a predetermined amount of data throughput over a network of the system. Moreover, in some example, key rotation may be done automatically or manually depending on a company's policies. Automatic encryption key rotation may be done when a key has expired or after a certain number/quantity of usage. Manual key rotation may be performed on-demand (e.g., on-the-fly, dynamically) when a compromise is detected or simply to have greater coordination between teams/applications when this occurs. A FPE key manager may be incorporated in the systems of FIG. 3 to manage and rotate between the plurality of encryption keys 306. The key manager 306 may provide the current key to an authorized FPE encrypter 308; and in the case of an FPE decrypter 310, upon input of a specific key ID 412, the key manager 306 may provide the corresponding key from the pool of keys.

In one example involving optimization of hexadecimal digits in a ciphertext, the systems of FIG. 3 may result in an improvement in memory consumption. In one example, assume that social security numbers are securely stored using format-preserving encryption (FPE), as generally described herein. With social security numbers (SSN), the range of possible plaintext values for each character in each of the nine characters in a SSN is 0 □ 9. In decimal notation, values of 0 through 9 each require 4 bits for storage. Coincidentally, hexadecimal notation also required 4 bits for each hexadecimal character, however, with hexadecimal notation, values of A □ F are also possible for each character without consuming any additional bits. In other words, at a minimum, a SSN consumes 36 bits of memory (or 9 hexadecimal characters in memory). Given the aforementioned, the key identifier 408A for a SSN number is a minimum of six characters (or 24 bits of memory). The six characters (with each character being 4 bits in length) can collectively represent a maximum integer value of 999,999. Meanwhile, once optimized for hexadecimal notation, the 999,999 integer value can be compressed/translated into the bits required for just five characters (i.e., 20 bits). In other words, the maximum decimal value of 2^20 (i.e., 0 □ 1,048,575), which be represented by five characters, is greater than the 999,999 integer value. As such, in this example, with a six-digit key identifier 408A, five of those digits are allocated to the compressed/translated ciphertext 410A while still allowing one character (i.e., 4 bits) for the plaintext-readable key ID field (e.g., the field storing key IDs 412, 414). Furthermore, the 4-bit key ID field permits up to 16 rotating, encryption key IDs corresponding to hexadecimal values of 0 □ 9, A □ F. In some examples, the systems of FIG. 3 may restrict the key ID values to just A□F (i.e., six rotating keys) to clearly flag the encryption key ID field in the ciphertext of the SSN.

The preceding SSN example assumed the ciphertext resulting from FPE encryption of a nine-digit SSN results in a nine-digit number comprising just 0 □ 9. However, in some examples, while the plaintext SSN comprises just 0 □ 9 values, the resulting ciphertext may not be limited to just 0 □ 9 values. In those instances, the calculation of the minimum length of key identifier 408A will result in a length different than six characters. For example, if values of 0□ 9 and □A□ are possible in the ciphertext of a SSN, then the desired length of the key identifier is eight hexadecimals (i.e., 32 bits). Meanwhile, in other examples, the key ID field may be less than the full bit-count of a character of the SSN. In other words, assuming each character in the SSN is allocated 4 bits, just two bits of the 4 bits of a character may be allocated to the key ID field. In such an example, the number of rotating keys is limited to just four keys; moreover, the FPE coder 318 in such a system may be more heavily relied upon to decode/translate the key ID field because a user may not be able to simply view a character of the SSN to immediately identify the value of the key ID field. Rather, some computations may be desired before the identification is possible. While the preceding example references each character consuming just 4 bits of memory, in another example, each character may be represented as ASCII (e.g., UTF-8 or other formatting), as described in related, U.S. patent application Ser. No. 15/276,121, which was previously incorporated by reference in its entirety, including but not limited to Table 2.

While the preceding example uses social security number (SSN) for purposes of illustration, other types of data may also be encrypted and encoded/translated as disclosed herein. For example, credit card numbers and other confidential information may be secured using the systems and methods disclosed herein. Credit card numbers may be represented, in some embodiments, as sixteen-digit numbers composed of a four-six digit bank identification number (BIN) followed by a personal account number (PAN) followed by a special checksum digit that's computed deterministically based on the previous digits. For example, with some credit card company providers, the credit card number may occupy just fifteen digits and include a PAN as short as eight digits. In other examples contemplated by this disclosure, a plaintext credit card number may be a different predefined length of characters, including a combination in some examples of numbers and/or alphabetic characters. And, the credit card number may be composed of all, some, none, or other portions besides those listed here. In addition, besides credit card numbers, other examples of unique identifiers for payment systems and other systems are contemplated. For example, a unique bit string of a different length may be used by mobile payment providers, such as those using near field code (NFC) or other short-range wireless communication protocols, to authorize a secure payment instruction.

In yet other examples, data other than credit card numbers is contemplated for use with the systems and methods disclosed herein. For example, social security numbers and other confidential user identification information may be secured for transmission and storage using one or more of the features disclosed herein. Like a credit card number with its various predefined portions, this confidential user identification information may also be comprised of one or more predefined portions. In addition to credit card numbers and social security numbers, other data contemplated by this disclosure include, but is not limited to, government identifications with fixed formatting such as passport numbers, alien registration cards, permanent residence cards, and other unique identification information.

Referring to FIG. 3C, like in FIG. 1A and FIG. 1B, the client computing device 141 may correspond to the machine 201 illustrated in FIG. 3C. Moreover, in some embodiments, the data store 302 may be located inside of the device 201, but in other embodiments the data store 302 may be communicatively coupled to the user computing device 201 as illustrated in FIG. 1A and FIG. 1B.

While FIG. 3 has been described with various components positioned at different parts of the system, the dotted line in FIG. 3B illustrates that although the user computing device 201 could be expanded to encompass the other components 302, 318 illustrated. Such a system is contemplated by the disclosure and would be recognized by a person having skill in the art after review of the entirety disclosed herein, including those materials incorporated by reference.

Unlike existing system, the system 100 disclosed here results in the transformation of data file into encrypted files comprising both content and a file encryption key (FEK). At least one benefit of such a transformation is that the system 100 does not require a separate mechanism for management of encryption keys. In particular, in those examples where a new FEK is generated for each data file, the number of FEKs may be voluminous. Management of the keys would become cumbersome. Rather, with the system 100 disclosed herein, a FEK is stored with (e.g., merged with) its corresponding encrypted data, thus alleviating the requirement for a separate mechanism.

Moreover, the system 100 results in improved/reduced network bandwidth consumption because while providing a secure, centrally-managed encryption service for distributed user computing devices 141, 201. In those examples where only a portion of the encrypted file is sent to a central server 101, 304 for encryption with a CEK, bandwidth is conserved while security is enhanced. Moreover, the system 100 allows for user device 141 to be cut off from access to their data file's contents even though the user computing device 201 may in control of the data store 302 storing those encrypted files. Moreover, the device 201 may also have the FEKs stored on the device. Nevertheless, the central server 101, 304 serves a gatekeeper to access to those local files.

While not illustrated in the figures, the enhanced security provided by the system 100 is useful with distributed machines, such as kiosks and automated teller machines (ATMs) that dispense cash. Although these machines are remotely located and distributed over an area, a central server 101 may control those ATMs access to sensitive, encrypted data. For example, if an ATM is compromised or stolen in some way, although sensitive data may be stored on the ATMs, as well as encryption keys (FEKs), the data would still remain secure because the CEK would be inaccessible to the ATM.

Finally, the system 100 results in a reduced load for a central encryption server 101, 304 because it transfers the bulk of encryption duties local devices 141, 201. Especially for large data files, allowing the device's processor 103 perform the intensive encryption routines saves load from the central server. Meanwhile, the central server 101 maintains control over the data through the CEK and the additional layer of protection place it places on the data contents and FEKs.

Finally, although various embodiments have been described as being used on a data file, other types and data structures are contemplated. For example, the attached may be used with data blob structures or with data packets or streams. For example, each instance of a data stream may be encrypted with one or more of the methods disclosed herein before transmitting to a user.

We claim:
1. A method comprising:
  a. generating a file encryption key, wherein the file encryption key is symmetric;
  b. encrypting, at a client device, a data file using the file encryption key;
  c. transmitting from the client device, over a network, a portion of the encrypted data file to a central encryption server, wherein the portion is the first predetermined number of bytes of the encrypted data file;

d. receiving at the client device, over the network, a twice-encrypted portion of the data file, wherein the twice-encrypted portion is encrypted using a secret, central encryption key stored only at the central encryption server;

e. transmitting from the client device, over the network, the file encryption key to the central encryption server;

f. receiving at the client device, over the network, the encrypted file encryption key;

g. constructing a new file comprising the twice-encrypted portion of the data file, the encrypted file encryption key, and a remaining portion of the encrypted data file that was not sent to the central encryption server; and h. storing the new file in a data store.

2. The method of claim 1, further comprising:

a. computing a checksum of the data file;

b. encrypting the checksum using the file encryption key; and c. storing the checksum in the new file.

3. The method of claim 1, wherein the portion of the encrypted data file is 1024 bytes.

4. The method of claim 1, wherein the data file is a blob data type.

5. The method of claim 1, wherein the central encryption server centrally manages access to the data file by refusing to encrypt data files for unauthorized devices.

6. The method of claim 1, wherein the file encryption key is discarded immediately after being transmitted to the central encryption server.

7. The method of claim 1, further comprising:

a. computing a checksum of the encrypted data file;

b. transmitting, over the network, the checksum to the central encryption server;

c. receiving, over the network, the encrypted checksum; and d. storing the encrypted checksum in the new file.

8. The method of claim 1, wherein the new file is a single file stored in the data store.

9. A method comprising:

a. receiving a data file from a data store;

b. extracting the new file to obtain a twice-encrypted portion of the data file, an encrypted file encryption key, and a remaining portion of the encrypted data file that was not twice encrypted, wherein the twice-encrypted portion of the data file is a first predetermined number of bytes of the data file;

c. transmitting, over a network, the twice-encrypted portion of the data file to a central encryption server;

d. receiving, over the network, in response to transmitting the twice-encrypted portion of the data file, a single-encrypted portion of the data file, wherein the twice-encrypted portion is decrypted using a secret, central encryption key stored only at the central encryption server;

e. merging the single-encrypted portion of the data file with the remaining portion of the encrypted data file;

f. transmitting, over the network, the encrypted file encryption key to the central encryption server;

g. receiving, over the network, in response to transmitting the encrypted file encryption key, a file encryption key; and h. decrypting the merged data file using the file encryption key.

10. The method of claim 9, further comprising:

a. computing a checksum of the data file;

b. encrypting the checksum using the file encryption key; and c. storing the checksum in the new file.

11. The method of claim 9, wherein the portion of the encrypted data file is 1024 bytes.

12. The method of claim 9, wherein the data file is a blob data type.

13. The method of claim 9, wherein the central encryption server centrally manages access to the data file by refusing to decrypt data files for unauthorized devices.

14. The method of claim 9, wherein the file encryption key is discarded immediately after decrypting the merged data file.

15. The method of claim 9, further comprising:

a. computing a checksum of the encrypted data file;

b. transmitting, over the network, the checksum to the central encryption server;

c. receiving, over the network, the encrypted checksum; and d. storing the encrypted checksum in the new file.

16. The method of claim 9, wherein the merged data file is a single file to be stored in the data store.

17. A system comprising:

a data store storing a plurality of data structures, where a first data structure of the plurality of data structures comprises an encrypted file encryption key (FEK), a twice-encrypted portion of a data file, and a remaining portion of the data file that is not twice-encrypted;

a network communicatively coupling a client computing machine with a central encryption server machine;

the central encryption server machine comprising a central encryption key that is unknown to the client computing machine; and the client computing machine communicatively coupled with the data store, the client computing machine comprising a processor and a memory storing computer-executable instructions that when executed by the processor cause the client computing machine to:

retrieve, from the data store, the first data structure;

remove from the first data structure the encrypted FEK and the twice-encrypted portion of the data file;

transmit, over the network to the central encryption server machine, the encrypted FEK and the twice-encrypted portion of the data file;

receive, from the central encryption server machine, a single-encrypted portion of the data file corresponding to the twice-encrypted portion of the data file;

receive, from the central encryption server machine, a plaintext file encryption (FEK) corresponding to encrypted FEK;

concatenating, into a single new data file, the single-encrypted portion of the data file with the remaining portion of the data file;

decrypt, using the plaintext FEK, the single new data file; and providing, by the client computing machine, the decrypted single new data file.

18. The system of claim 17, wherein the memory storing further computer-executable instructions that when executed by the processor cause the client computing machine to:

a. compute a checksum of the data file; and b. encrypt the checksum using the file encryption key.

19. The system of claim 17, wherein the twice-encrypted portion of the data file is 1024 bytes, and the data file is larger than 1024 bytes.

20. The system of claim 17, wherein the data file is a blob data type.

* * * * *